United States Patent
Rupiper et al.

[11] Patent Number: 5,934,836
[45] Date of Patent: Aug. 10, 1999

[54] GROUND ANCHOR DEVICE

[75] Inventors: Stan Rupiper, Tahoma, Calif.; Michael R. Ludwig, Denver, Colo.

[73] Assignee: Integrated Stabilization Technologies, Inc., Denver, Colo.

[21] Appl. No.: 09/008,604

[22] Filed: Jan. 17, 1998

Related U.S. Application Data

[63] Continuation-in-part of application No. 08/887,151, Jul. 2, 1997.

[51] Int. Cl.$^6$ ............................................. E02D 5/74
[52] U.S. Cl. ..................... 405/244; 405/236; 405/266; 52/157
[58] Field of Search .................... 405/233, 241, 405/242, 244, 258, 259.1, 263, 266, 269, 303, 236; 75/19, 22, 321; 52/155, 157, 158, 169.13, 705, 707

[56] References Cited

U.S. PATENT DOCUMENTS

| | | | |
|---|---|---|---|
| Re. 32,076 | 2/1986 | Dziedzic ............................ | 405/303 |
| 1,940,938 | 12/1933 | Chance ............................... | 52/157 |
| 3,115,226 | 12/1963 | Thompson, Jr. .................... | 405/244 X |
| 3,148,510 | 9/1964 | Sullivan ............................. | 405/259.1 |
| 3,243,962 | 4/1966 | Ratliff ................................ | 405/266 |
| 4,533,279 | 8/1985 | Van Den Elzen et al. ......... | 405/241 X |
| 4,659,259 | 4/1987 | Reed et al. ......................... | 405/263 |
| 5,145,286 | 9/1992 | Summers ............................ | 405/258 |
| 5,707,180 | 1/1998 | Vickars et al. ..................... | 405/233 |

*Primary Examiner*—Tamara Graysay
*Assistant Examiner*—Jong-Suk Lee
*Attorney, Agent, or Firm*—Edwin H. Crabtree; Ramon L. Pizarro; Donald W. Margolis

[57] ABSTRACT

A ground anchor device for securing a building foundation and other structures to a ground surface using the subject anchor device. The anchor device is designed to be self advancing when rotated into the ground surface to depths of 10 to 30 feet and greater. The device includes one or more hollow pipe sections coupled together and connected to a pipe extension with drill point. The pipe extension includes a helice therearound for helping advance the anchor device into the ground surface. The pipe extension and hollow pipe sections are driven into the ground using a kelly bar. The kelly bar includes one end having a square drive section which is received inside a square opening in a drive collar. The drive collar is mounted to an inner circumference of the pipe extension. When the kelly bar is rotated, the square drive section of the kelly bar engages the sides of the drive collar for rotating the pipe extension and pipe sections. The kelly bar also includes a hold down bar collar which engages a top of an internal collar attached to one end of a pipe section. The hold down bar collar holds the kelly bar against a top of the pipe extension. The hollow pipe sections and pipe extension include grout holes therein for introducing grout under pressure into the surrounding soil when the drilling has been completed and the kelly bar removed.

16 Claims, 2 Drawing Sheets

GROUND ANCHOR DEVICE

The subject invention is a continuation-in-part application of Ser. Number 08/887,151, title "DRIVE DEVICE USED FOR SOIL STABILIZATION", filed on Jul. 2, 1997. The subject inventors are also co-inventors of the CIP application. Both of the applications have been assigned to Integrated Stabilization Technologies, Inc., a Colorado Corporation.

BACKGROUND OF THE INVENTION (a) Field of the Invention

This invention relates to an anchor device for use in securing different types of structures on a ground surface and more particularly, but not by way of limitation, to an anchor device used for supporting building foundations, poles, signs, and other types of structures typically mounted or formed on a ground surface and requiring an enhanced foundation support.

(b) Discussion of Prior Art

Heretofore there have been a variety of different types of helical plate bearing anchors mounted on solid steel bar shafts and pipe shafts with plate helices that are drilled into soil and used as tension, compression and lateral force resisting members.

Also, there are many types of hollow drill rods and drill shafts used for circulating water, drill mud and the like during a drilling operation. The drill rods and shafts can be used with grout in forming tiebacks, mini-piles, rock anchors, soil nails and other micro pile uses. The usual exterior diameter of the rods and shafts are less than 2 inches.

Further, there are various types of auger tools made in the United States. The auger tools are used for excavating holes and may be used for collecting soil samples. This type of tool may have either a solid or hollow shaft with a disposable drill head. Also flight augers have continuous helices along the length of the shaft. Because of the expense of this type of auger, the auger is generally removed from a drill hole and not left in place to be used with grout in forming a mini-pile.

Still further, many steel piles are installed today using pipe of various sizes and weights. The load carrying capacity of this type of pile is usually developed by skin friction and/or point bearing. The steel piles are driven by a pile driving hammer or by boring a hole and placing grout around the exterior of the steel pile received in the hole.

In U.S. Pat. No. 5,575,593 to Raaf, a method and apparatus for installing a helical pier with pressurized grouting is disclosed. The patent describes the forming of grout nodules attached to an exterior of a pier column. The pier column includes a bracket for securing the column to a building foundation. The Raaf pier column is not designed to be reusable nor is it used for extracting fluids from a subsurface.

In U.S. Pat. No. 4,009,582 to LeCorgne, a method is described for forming a caseless concrete pile using a hollow pipe, a connector and a tubular driving mandrel. In U.S. Pat. No. 3,512,366 to Turzillo, a hollow auger for drilling holes is disclosed. The auger described in the Turzillo patent is withdrawn from the hole leaving a steel rod with drill bit in place with concrete poured therearound for forming a concrete pier.

In U.S. Pat. Nos. 4,492,493 and 4,756,129 to Webb and 3,115,226 to Thompson, Jr. different types of ground anchors and apparatus are described. Also, U.S. Pat. Nos. 4,998,849 to Summers, 3,961,671 to Adams et al. and 4,678,373 to Langenbach, Jr. disclose different types of driving apparatus and methods of shoring structures.

None of the above patents disclose or teach the unique combination of structure and functions of the subject anchor device having a pipe extension with drill point connected to one more hollow pipe sections. The pipe extension and pipe sections adapted for receiving and introducing grout into the surrounding soil.

SUMMARY OF THE INVENTION

In view of the foregoing, it is a primary object of the present invention to provide an anchor device with helices that is self advancing into different types of soils and has the ability to draw into the ground surface one or more lengths of hollow pipe sections which are left in place along with a pipe extension with drill point.

Another object of the invention is the anchor device is self advancing when using a rotating kelly bar. The anchor device may be rotated into the soil from a few feet to depths of 20 to 30 feet and greater. The device can be increased in size to suit nearly all soil and load conditions.

Still another object of the subject invention is to provide a rugged yet inexpensive drilling tool. Also the anchor device, when the kelly bar is removed, can be left in place for receiving grout under pressure and introducing the grout into the surrounding soil and internally for forming a soil anchor and load carry pier.

The subject anchor device includes one or more hollow pipe sections coupled together and connected to a pipe extension with drill point. The pipe extension includes a helice therearound for helping advance the anchor device into the ground surface. The pipe extension and hollow pipe sections are driven into the ground using a kelly bar. The kelly bar includes one end having a square drive section which is received inside a square opening in a drive collar. The drive collar is mounted to an inner circumference of the pipe extension. When the kelly bar is rotated, the square drive section of the kelly bar engages the sides of the drive collar for rotating the pipe extension and pipe sections. The kelly bar also includes a hold down bar collar which engages a top of an internal collar attached to one end of a pipe section. The hold down bar collar holds the pipe section against a top of the pipe extension. The hollow pipe sections may be coupled together using a standard threaded coupling and the like or a coupling with helice thereon. The hollow pipe sections and pipe extension include grout holes therein for introducing grout under pressure into the surrounding soil when the drilling has been completed and the kelly bar removed. The grouted pipe sections and pipe extension form an inexpensive yet strong ground anchor for holding building foundations and other types of structures in place.

These and other objects of the present invention will become apparent to those familiar with screw anchor stabilization equipment and methods of supporting building foundations from the following detailed description, showing novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
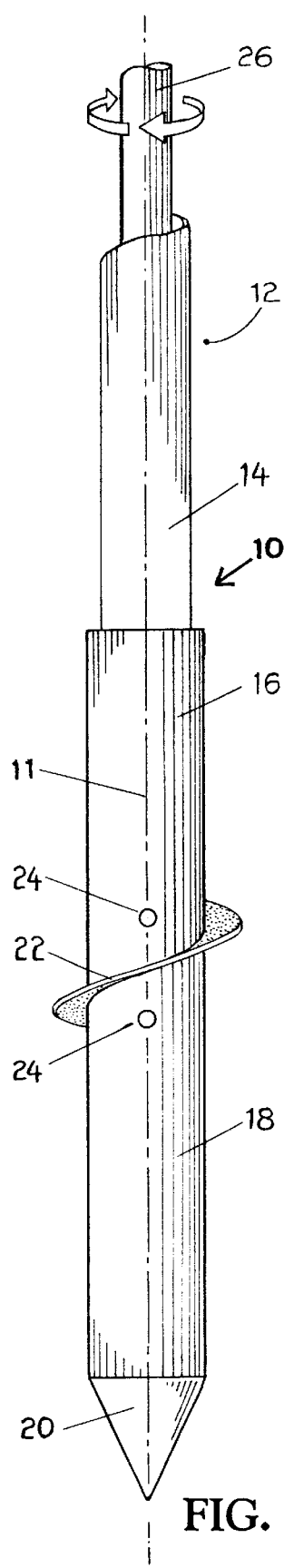
FIG. 1 is a front view of the subject anchor device having been driven to a selected depth in a ground surface. The anchor device is shown with a pipe extension and drill point. A portion of a hollow pipe section is shown received in a top of the pipe extension.

In FIG. 1, a front view of the subject anchor device is shown having a general reference numeral 10. The anchor device 10 has been driven to a selected depth in a subsurface 12. The device 10 includes one or more hollow pipe sections 14 coupled together and connected to a top portion 16 of a pipe extension 18 with drill point 20. The pipe extension 18 also includes a helice 22 therearound for helping auger the anchor device 10 into the subsurface 12. Further, the pipe extension 18 includes grout holes 24 in the side thereof for introducing grout and other fluids under pressure into the surrounding soil.

The device 10 is shown with a center line 11 through the center and along the length of the pipe section 14 and the pipe extension 18. The diameter and lengths of the hollow pipe sections 14 will vary depending on the application. Extending upwardly from the hollow pipe section 14 is a portion of a kelly bar 26 which is used for rotating the pipe extension into the subsurface 12.

Figure 2:
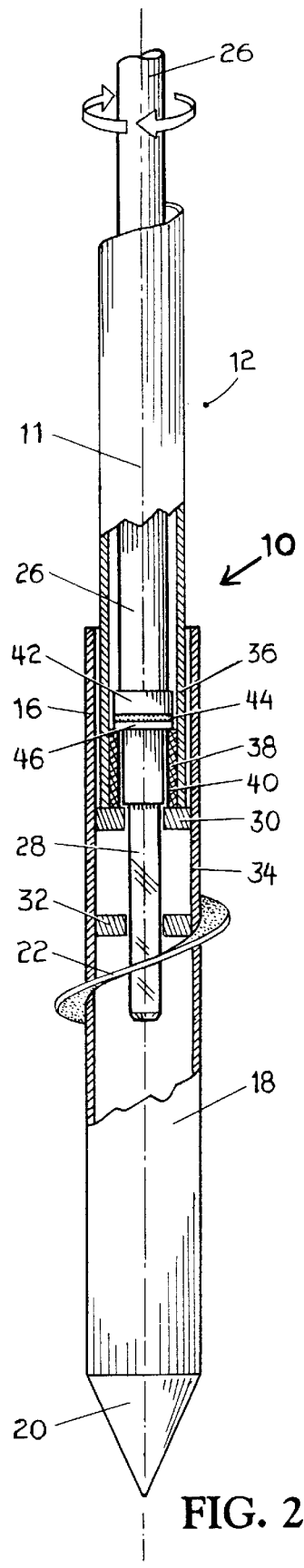
FIG. 2 is a front view of the subject anchor device similar to FIG. 1 and having a portion of the top of the pipe extension and a portion of the hollow pipe section cut away. In this drawing, a lower end of a kelly bar is shown engaging a pair of drive collars attached to an inner circumference of the pipe extension.

In FIG. 2, a front view of the subject anchor device 10 is shown and similar to FIG. 1. In this drawing, the top portion 16 of the pipe extension 18 and a portion of the hollow pipe section 14 have been cut away. A lower end 28, having a square cross section, of a kelly bar 26 is shown engaging an upper drive collar 30 and a lower drive collar 32. The drive collars 30 and 32 are attached to an inner circumference 34 of the pipe extension 18. Attached to a lower end 36 of the pipe section 14 is an internal collar 38 which has been attached to an inner circumference 40 of the pipe section 14. The lower end 28 of the kelly bar 26 includes a pipe section hold down collar 42 which is attached to the kelly bar 26 and rotates thereon. The hold down collar 42 is received on top and rotates on a TEFLON, a low friction plastic washer 44 and hold down washer 46. The hold down washer 46 is used to engage the top of the internal collar 38 and draw the pipe section 14 downwardly into the ground surface as the kelly bar 26 rotates the pipe extension 18.

Figure 3:
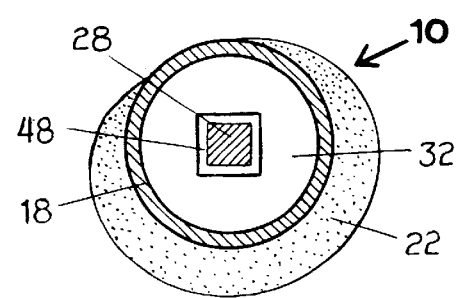
FIG. 3 is an enlarged front view of the lower end of the kelly bar, an upper portion of the pipe extension and a lower portion of the hollow pipe section.
Figure 4:
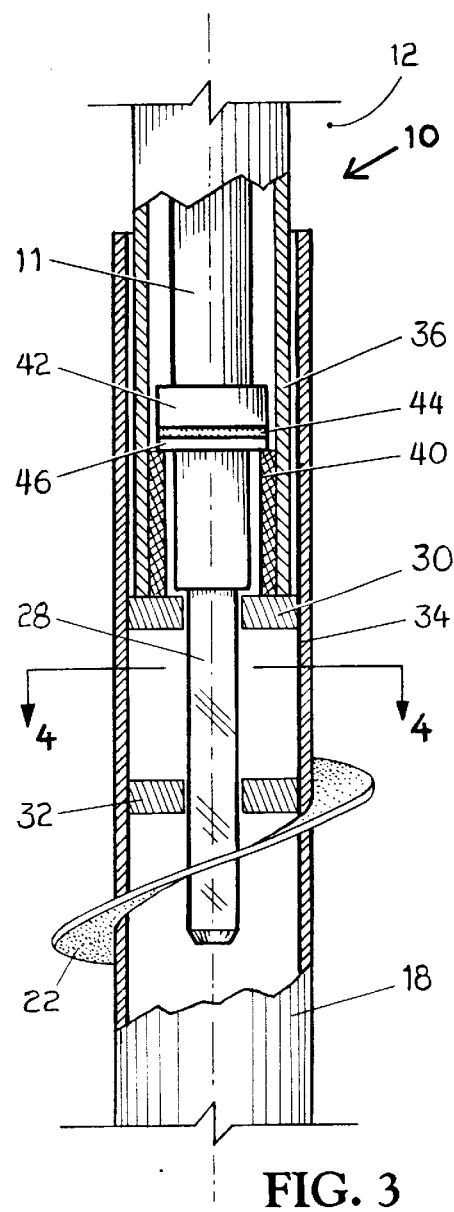
FIG. 4 is a cross section of the pipe extension and the kelly bar taken along lines 4—4 shown in FIG. 3.

In FIG. 3, an enlarged front view of the lower end 28 of the kelly bar 26 is shown received through a square opening 48 in both the upper drive collar 30 and the lower drive collar 32. The square opening 48 is shown in FIG. 4. Also shown in this enlarged view, is the hold down washer 46 resting on top of the internal collar 38 for urging the pipe section 14 or pipe sections 14 downwardly, when the anchor device 10 is rotated into the subsurface 12 using the rotating kelly bar 26.

In FIG. 4, a cross section of the pipe extension 18 and the lower portion 28 of the kelly bar 26 is shown taken along lines 4-4 in FIG. 3. In operation, when the kelly bar 26 is rotated for auguring the anchor device 10 into the subsurface 12, the sides of the lower portion 28 of the kelly bar 26 engage the sides in the square opening 48 of the upper and lower drive collars 30 and 32.

Figure 5:
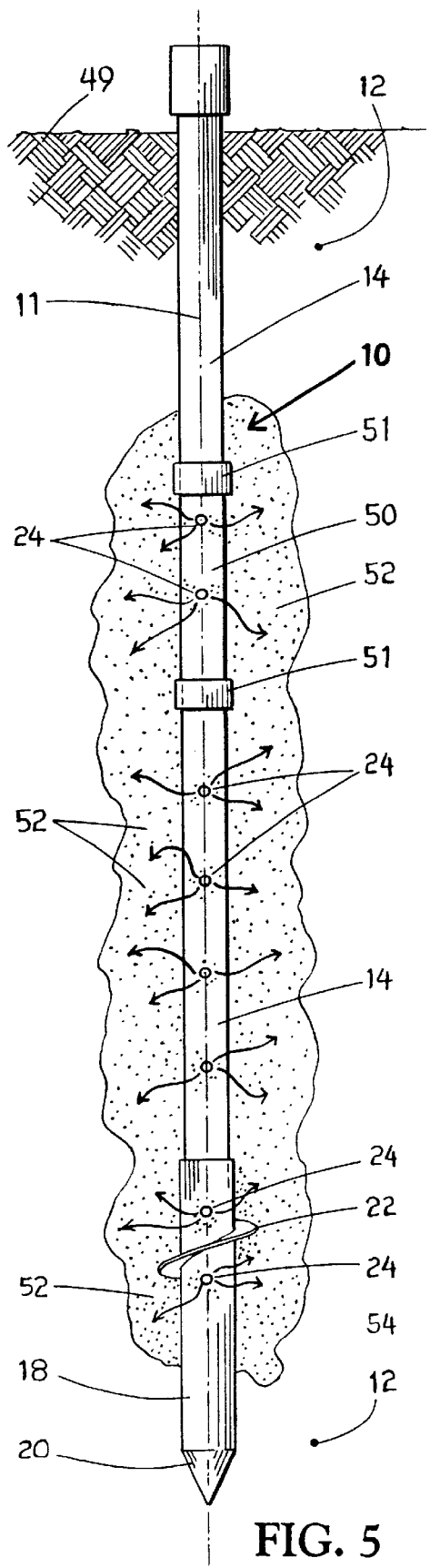
FIG. 5 is a front view of the subject invention with a pair of hollow pipe sections connected together using a pipe section coupling. Also grout is shown being injected outwardly from grout holes in the sides of the pipe sections, in the sides of the coupling and the sides of the pipe extension.

In FIG. 5, a front view of the subject invention is shown extending downwardly from a ground surface 49 into the subsurface 12. In this view, a pair of hollow pipe sections 14 are connected together using a pipe section coupling 50 with threaded connecting collars 51 for joining the two pipe sections 14. While the pipe section coupling 50 is shown, it can be appreciated that various types of couplings and connecting collars can be used equally well for connecting together the pipe sections 14 as they are advanced into the subsurface 12. The pipe coupling 50 and the lower pipe section 14 are shown with grout holes 24 therein for introducing grout 52 shown as small dots in the drawing. The grout 52 is shown being injected downwardly through the pipes sections 14 and the pipe extension 18 and outwardly through the grout holes 24 into the surrounding soil as indicated by arrows 54.

Figure 6:
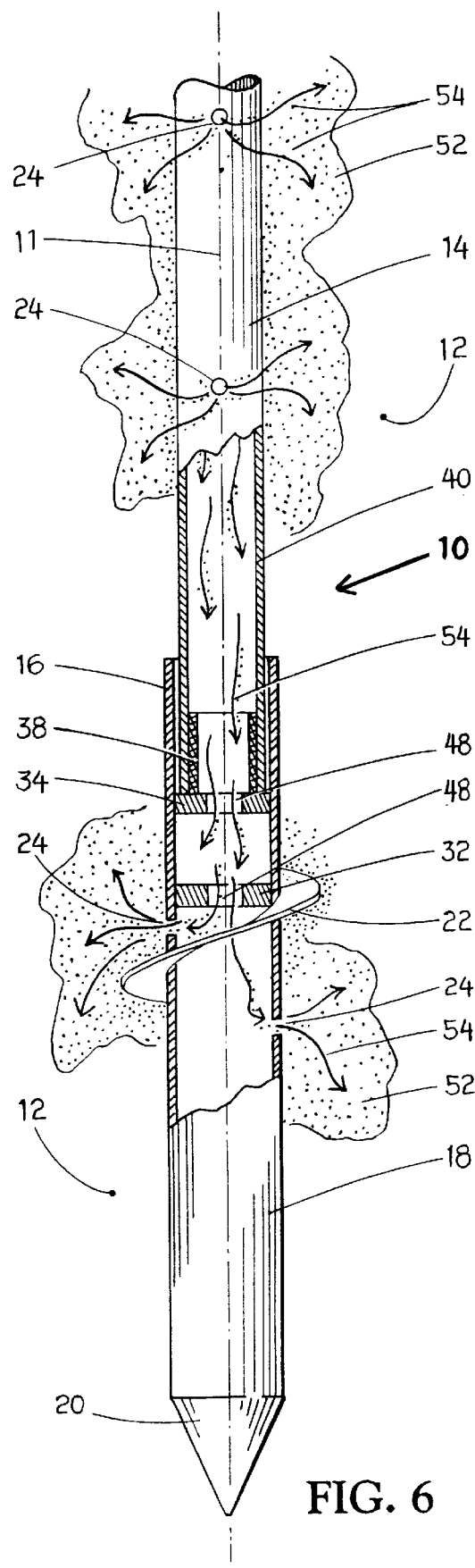
FIG. 6 is a front view of the subject anchor device similar to FIG. 2 and having a portion of the top of the pipe extension and a portion of the hollow pipe section cut away. In this drawing, the kelly bar has been removed and grout is being circulated downwardly through the hollow pipe section and the pipe extension and outwardly into the surrounding soil as indicated by arrows.

In FIG. 6, a front view of the subject anchor device 10 is shown similar to FIG. 2 and having a portion of the top of the pipe extension 18 and a portion of the hollow pipe section 14 cut away. In this drawing, the kelly bar 26 has been removed and the grout 52 is being circulated downwardly from the ground surface 49. The grout 52 is pumped under pressure through the hollow pipe section 14, through the openings 48 in the drive collars 30 and 32 in the pipe extension 18 and outwardly into the surrounding soil, as indicated by the arrows 54. While not shown in the drawings, a packer assembly may be used for inserting inside the hollow pipe sections 14 and lowered to specific levels therein for pumping the grout 52 or any other type of fluids under pressure into the surrounding soil. Further, the pipe sections 14 and the pipe extension 18 may be filled with grout 52 for providing additional strength in forming an inexpensive yet strong ground anchor for various types of building structures.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A ground anchor device for securing a building foundation and other structures to a ground surface, the anchor device designed to be self advancing when rotated into the ground surface to depths of 10 to 30 feet and greater, the anchor device comprising:

a pipe extension with a helix thereon;

at least one hollow pipe section, said pipe section having a lower end received in an upper end of said pipe extension; and rotation means for releasably engaging said pipe extension and rotating said pipe extension and said pipe section into the ground surface.

2. The anchor device as described in claim 1 wherein said rotation means is a kelly bar.

3. The anchor device as described in claim 2 wherein said kelly bar has a lower end portion with a square cross section, the square cross section received in an opening in at least one drive collar attached to an inner circumference of said pipe extension.

4. The anchor device as described in claim 1 further including a drill point attached to a lower end of said pipe extension.

5. The anchor device as described in claim 1 wherein said pipe extension includes a plurality of grout holes therein and adapted for receiving grout therethrough.

6. The anchor device as described in claim 1 wherein said pipe section includes a plurality of grout holes therein and adapted for receiving grout therethrough.

7. A ground anchor device for securing a building foundation and other structures to a ground surface, the anchor device designed to be self advancing when rotated into the ground surface to depths of 10 to 30 feet and greater, the anchor device comprising:

a pipe extension with a helix thereon;

at least one hollow pipe section, said pipe section having a lower end received in an upper end of said pipe extension; and a kelly bar, said kelly bar having a lower end portion adapted for receipt in said pipe extension and for releasably engaging said pipe extension and rotating said pipe extension and said pipe section into the ground surface.

8. The anchor device as described in claim 7 wherein said kelly bar has a lower end portion with a square cross section, the square cross section received in an opening in a pair of drive collars attached to an inner circumference of said pipe extension.

9. The anchor device as described in claim 7 wherein said kelly bar includes a hold down collar attached thereto for engaging an internal collar attached to an inner diameter of the lower end of said hollow pipe section.

10. The anchor device as described in claim 7 wherein said pipe extension includes grout holes therein and along the length thereof and adapted for receiving grout therethrough.

11. The anchor device as described in claim 7 wherein said pipe section includes grout holes therein and adapted for receiving grout therethrough.

12. The anchor device as described in claim 7 further including a plurality of pipe sections connected together by pipe section couplings.

13. A ground anchor device for securing a building foundation and other structures to a ground surface, the anchor device designed to be self advancing when rotated into the ground surface to depths of 10 to 30 feet and greater, the anchor device comprising:

a pipe extension with a helix thereon;

a plurality of hollow pipe sections, said pipe sections connected together by pipe section couplings, one of said pipe sections having a lower end received in an upper end of said pipe extension; and a kelly bar, said kelly bar having a lower end portion adapted for receipt in said pipe extension and for releasably engaging said pipe extension and rotating said pipe extension and said pipe section into the ground surface, said kelly bar having a lower end portion with a square cross section, the square cross section received in an opening in a pair of drive collars, said drive collars attached to an inner circumference of said pipe extension.

14. The anchor device as described in claim 13 wherein said kelly bar includes a hold down collar with a hold down washer and a a low friction plastic, said teflon washer disposed between said hold down collar and said hold down washer, said hold down washer engaging a top of an internal collar attached to an inner diameter of the lower end of said hollow pipe section.

15. The anchor device as described in claim 13 wherein said pipe extension includes a plurality of grout holes therein and along the length thereof and adapted for receiving grout therethrough.

16. The anchor device as described in claim 13 wherein said pipe sections includes a plurality of grout holes therein and adapted for receiving grout therethrough.

* * * * *